United States Patent
Ooi et al.

(10) Patent No.: US 10,318,173 B2
(45) Date of Patent: Jun. 11, 2019

(54) MULTI-SPEED DATA STORAGE DEVICE WITH MEDIA CACHE FOR HIGH SPEED WRITES

(71) Applicant: Seagate Technology LLC, Cupertino, CA (US)

(72) Inventors: Kian Keong Ooi, Singapore (SG); Utt Heng Kan, Singapore (SG); Qiang Bi, Singapore (SG); Chi Sern Tan, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 54 days.

(21) Appl. No.: 15/281,857

(22) Filed: Sep. 30, 2016

(65) Prior Publication Data

US 2018/0095673 A1    Apr. 5, 2018

(51) Int. Cl.

| G06F 3/06 | (2006.01) |
|---|---|
| G11B 19/28 | (2006.01) |
| G06F 12/0866 | (2016.01) |
| G06F 12/0875 | (2016.01) |

(52) U.S. Cl.
CPC ............ *G06F 3/0611* (2013.01); *G06F 3/068* (2013.01); *G06F 3/0656* (2013.01); *G06F 12/0866* (2013.01); *G06F 12/0875* (2013.01); *G11B 19/28* (2013.01); *G06F 2212/217* (2013.01); *G06F 2212/222* (2013.01); *G06F 2212/224* (2013.01)

(58) Field of Classification Search
CPC .. G06F 3/0611; G06F 3/0656; G06F 12/0871; G06F 2212/222; G06F 3/068; G06F 2212/217; G06F 2212/313; G06F 2212/224; G06F 2212/281; G06F 2212/70; G06F 2212/1024; G11B 19/28

USPC ........................................................ 711/102
See application file for complete search history.

(56) References Cited

U.S. PATENT DOCUMENTS

| 4,933,795 A | 6/1990 | Nigam |
|---|---|---|
| 5,633,568 A | 5/1997 | Dunfield |
| 5,659,799 A | 8/1997 | Wu et al. |
| 6,262,545 B1 | 7/2001 | Yamamoto |
| 6,400,892 B1 | 6/2002 | Smith |
| 6,650,498 B1 | 11/2003 | Albrecht et al. |
| 6,914,745 B2 | 7/2005 | Takeuchi et al. |
| 8,713,280 B2 | 4/2014 | Anderson et al. |
| 9,214,188 B1 | 12/2015 | Tan et al. |

(Continued)

*Primary Examiner* — Hua J Song
(74) *Attorney, Agent, or Firm* — Hall Estill Attorneys at Law (57) ABSTRACT

Apparatus and method for managing data transfers in a data storage device with rotational media that can be rotated at different speeds. In some embodiments, a non-volatile main memory is formed on a rotatable medium accessed by a moveable data transducer. A media cache provides a non-volatile data storage area. A control circuit directs writes to the main memory as the medium is rotated at a first speed and directs reads from the main memory as the medium is rotated at a higher, second speed. Writes during the rotation of the medium at the second speed are directed to the media cache instead of to the main memory so that no data are written to the main memory at the second speed. The media cache may also be located on the medium or may be formed from solid-state semiconductor memory.

20 Claims, 6 Drawing Sheets

(56) References Cited

U.S. PATENT DOCUMENTS

| | | | |
|---|---|---|---|
| 2002/0191328 A1* | 12/2002 | Hamaguchi | G11B 5/5521 360/78.04 |
| 2003/0235408 A1 | 12/2003 | Silvester et al. | |
| 2004/0088456 A1 | 5/2004 | Zhang | |
| 2005/0007688 A1 | 1/2005 | Chang et al. | |
| 2009/0190245 A1* | 7/2009 | Nakata | G11B 5/455 360/31 |
| 2011/0087912 A1 | 4/2011 | Dickson | |

* cited by examiner

MULTI-SPEED DATA STORAGE DEVICE WITH MEDIA CACHE FOR HIGH SPEED WRITES

SUMMARY

Various embodiments of the present disclosure are generally directed to an apparatus and method for managing a data storage device having a rotatable data recording medium that can be rotated at different speeds.

In some embodiments, an apparatus includes a rotatable data recording medium supported by a spindle motor to provide a main memory as a non-volatile data storage area. The spindle motor is configured to provide constant angular velocity (CAV) rotation of the medium at different nominally constant speeds. A read/write data transducer is configured to write data to and read data from the main memory. A media cache is provided to form a non-volatile data storage area. A control circuit directs rotation of the data recording medium at a first speed during write operations by the data transducer to write user data to the main memory, directs the rotation of the data recording medium at a second speed greater than the first speed during read operations by the data transducer to read user data from the main memory, and directs the writing of user data to the media cache instead of to the main memory at the second speed so that no user data are written to the main memory at the second speed.

In other embodiments, a method includes providing a data storage device having a media cache, a data storage medium rotatable at different selectable constant angular velocity (CAV) speeds and having a plurality of tracks to define a main memory, and a data read/write transducer configured to access the data tracks in the main memory; using the transducer to write user data to the data tracks in the main memory as the medium is rotated at a first speed and to read user data from the data tracks in the main memory as the medium is rotated at a second speed greater than the first speed; writing user data to the media cache instead of to the main memory during rotation of the medium at the second speed so that no user data are written to the main memory at the second speed; and subsequently transferring the user data written to the media cache from the media cache to the main memory during rotation of the medium at the first speed.

These and other features and advantages which may characterize various embodiments can be understood in view of the following detailed discussion and the accompanying drawings.

DETAILED DESCRIPTION

Various embodiments of the present disclosure are generally directed to the management of data in a data storage device with multi-speed rotational capabilities.

Data storage devices are electronic-based user devices that include digital memory configured to store and retrieve data associated with a user. Storage devices use rotatable data recording media, such as rotatable magnetic recording discs, which are rotated by a spindle motor at a selected rotational speed (velocity).

An array of data read/write transducers fly adjacent the rotating disc recording surfaces to write data to, and read data from, concentric tracks defined on the recording surfaces. The transducers are aerodynamically supported by air currents established by the high speed rotation of the discs.

Generally, use of a higher rotational speed of the discs provides a number of operational advantages, such as the possibility of faster I/O performance, higher data transfer rates, etc. Modern hard disc drives (HDDs) at different price point and performance levels employ a number of different rotational speeds such as 5400 revolutions per minute (rpm), 7200 rpm, 10,800 rpm, 15,000 rpm, etc.

While operable, the use of higher rotational speeds can introduce a number of system limitations. Non-repeatable runout (NRRO) effects generally increase significantly at higher disc rotational speeds due to windage, spindle motor runout, higher levels of chassis vibration, etc. This can run counter to efforts to provide disc surfaces with higher track densities as well as employing precise data writing techniques such as shingled magnetic recording (SMR) where successively written tracks partially overlap previously written tracks.

Accordingly, various embodiments of the present disclosure are generally directed to a novel data storage device configuration in which one or more data recording media are rotated at different speeds during different operational modes.

In some embodiments, a lower rotational speed, such as 5400 rpm, is used during normal write operations, and a higher rotational speed, such as 7200 rpm, is used during read operations.

To reduce the need to switch the spindle motor between different speeds, a media cache arrangement is used to support the writing of data during higher speed operation. In some cases, the media cache may form a portion of the available disc recording surface area, such as a band of tracks near the outermost diameter (OD) of the discs. The tracks in the media cache can be provided to have a lower areal density; for example, the tracks may be physically wider than the normal data tracks, and may be written at a lower effective frequency.

Other forms of media cache locations can be utilized, including solid state memory cache (e.g., NAND flash memory, etc.). Regardless, the media cache allows writing of data to non-volatile memory storage while the discs remain rotating at the higher rotational rate to support ongoing read operations. The media cache can be viewed as a dual rpm zone since the data can be read from the zone at either speed. The media cache may provide convenient storage for other forms of data sets that can be accessed irrespective of operational mode, such as host device operating system (OS) files.

In this way, the device configuration generally supports lower rotational speed writes, which improves writeability, and higher rotational speed reads, which improves data transfer rate performance. Since writeback caching may be employed, write command complete statuses may be conveyed to a requesting host before the data have actually been written to the media. Using a slower rotational rate during normal writes to the main memory portion of the disc surfaces will not generally tend to provide a penalty from a host I/O standpoint.

Figure 1:
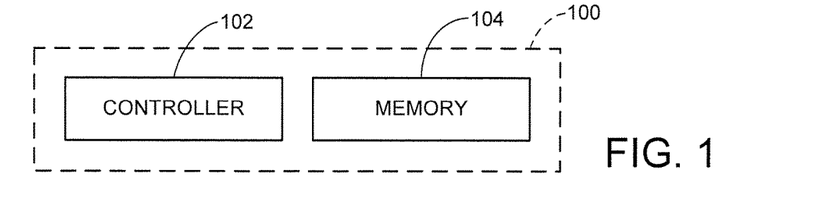
FIG. 1 provides a functional block representation of a data storage device in accordance with various embodiments of the present disclosure.

These and other features and advantages of various embodiments can be understood beginning with a review of FIG. 1 which provides a simplified functional block representation of a data storage device 100. The data storage device 100 includes a controller 102 and a memory module 104.

The controller 102 is a hardware or processor based circuit that provides top-level control of the device 100. In some embodiments, the controller 102 may be one or more programmable processors that utilize programming instructions stored in a local memory which are executed by the processor as required.

The memory module 104 can take a variety of forms, and includes one or more forms of non-volatile data storage memory to store user data supplied by the host device. The non-volatile data storage memory can include rotatable magnetic recording media (discs), solid state semiconductor memory (e.g., flash memory cells, STRAM, RRAM, etc.), etc. The memory module 104 can include additional elements such as read/write/erase control circuitry, data buffers, memory controller circuitry, etc. configured to manage the writing and subsequent reading of data to and from the non-volatile memory. In some cases, the controller functionality can be incorporated directly into the memory module.

Figure 2:
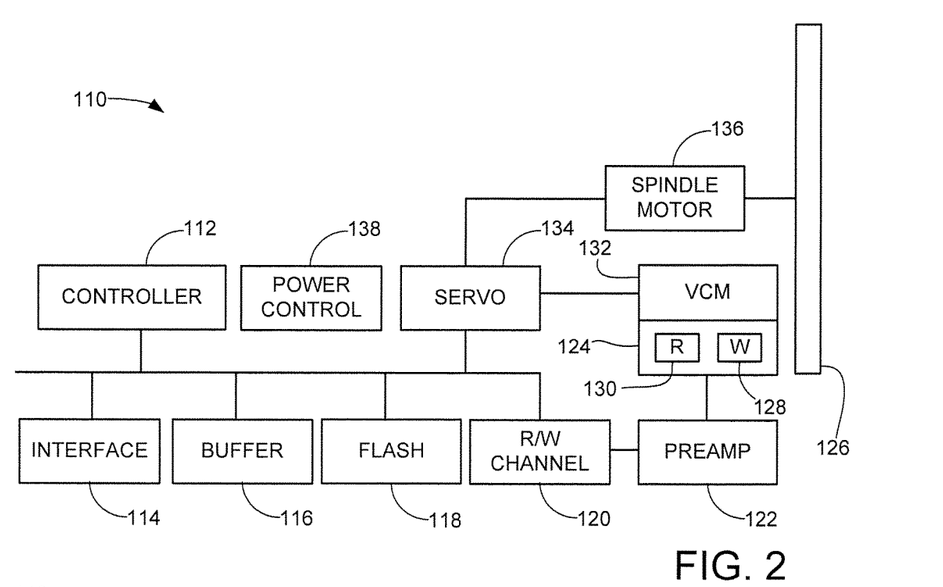
FIG. 2 is a functional block representation of the data storage device of FIG. 1 in accordance with some embodiments.

FIG. 2 shows a functional block representation of a data storage device 110 corresponding to the device 100 of FIG. 1. The data storage device 110 is characterized as a hard disc drive (HDD) in accordance with some embodiments. Other forms of storage devices can be used.

A top level controller 112 similar to the controller 102 in FIG. 1 provides communication and control functions. An interface circuit 114 interfaces with the host device via a selected interface protocol (e.g., SATA, SAS, Fibre Channel, Ethernet, USB, etc.). A local data buffer 116 provides temporary storage of user data being transferred to and from the host. The buffer 116 may be a volatile local memory, such as a DRAM, and may store control data and programming used by the controller 112 as well. A local non-volatile memory (flash) 118 can also provide local storage of data as required. The flash memory 118 may take a NAND and/or a NOR configuration.

A read/write (R/W) channel circuit 120 conditions data during write and read operations using a preamplifier/driver (preamp) circuit 122 and a data transducer 124. The transducer 124 is supported adjacent a rotatable magnetic recording medium (disc) 126 and includes a write (W) element 128, such as a perpendicular magnetic write coil, and a read (R) sensor 130, such as a magneto-resistive (MR) responsive element.

The respective elements 128, 130 are positioned adjacent concentric tracks defined on the data recording surface of medium 126 using a voice coil motor (VCM) 132 and a closed loop servo control circuit 134. The servo control circuit 134 also supplies control inputs to a spindle motor 136 to rotate the disc 126 at different operational speeds, as discussed below. A power control circuit 138 receives and conditions power values, such as supply voltage and/or current, for use by the various active elements of the storage device 110. The power may be supplied by a local device such as a battery or externally from the host or another power source.

Figure 3:
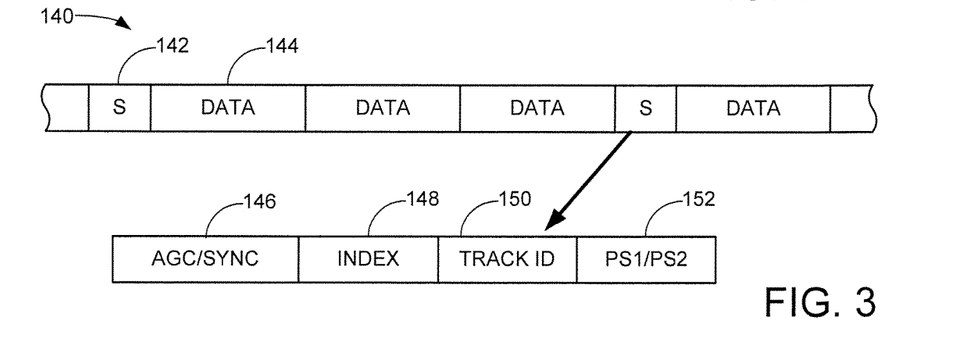
FIG. 3 is an exemplary format for a data track of the device of FIG. 2.

FIG. 3 shows an illustrative format for a data track 140. A number of concentric tracks such as the exemplary track 140 are defined on the respective recording surfaces of the disc 126. The tracks can take any number of suitable forms, including shingled magnetic recording (SMR) tracks, two dimensional magnetic recording (TDMR) tracks, bit patterned media tracks, etc.

The track 140 includes a number of servo fields 142 and data sectors 144. The servo fields 142 are arranged in the form of spaced apart servo wedges that extend across the disc surfaces much like spokes of a wheel. The data sectors 144 are defined in the spaces between adjacent pairs of the servo fields and are each configured to store a fixed amount of user data, such as 512 bytes, etc. Logical addressing, such as in the form of logical block addresses (LBAs) may be assigned to the respective data sectors.

An exemplary format for the servo fields 142 includes a leading automatic gain control (AGC) and synchronization (sync) field 146. This enables the readback circuitry and servo circuit to detect the beginning of each servo field, and prepares the readback electronics to decode the servo data. An index field 148 indicates the angular position of the servo field 142, and may include a once-around (zero degrees) angular index point. A track identification (ID) field 150 provides a multi-bit track address (such as Gray code) to detect the radial position of the servo field. Position dibit values in a PS1/PS2 field 152 allows intra-track position determination by the servo circuit.

The servo circuit 134 derives demodulated servo data to detect the position of the associated transducer. Corrections to the existing position of the transducer can be carried out by providing current to the VCM 132. Seeks can be carried out to move the transducer to a new destination track. Track following can be carried out to maintain a given transducer over a selected track.

Figure 4:
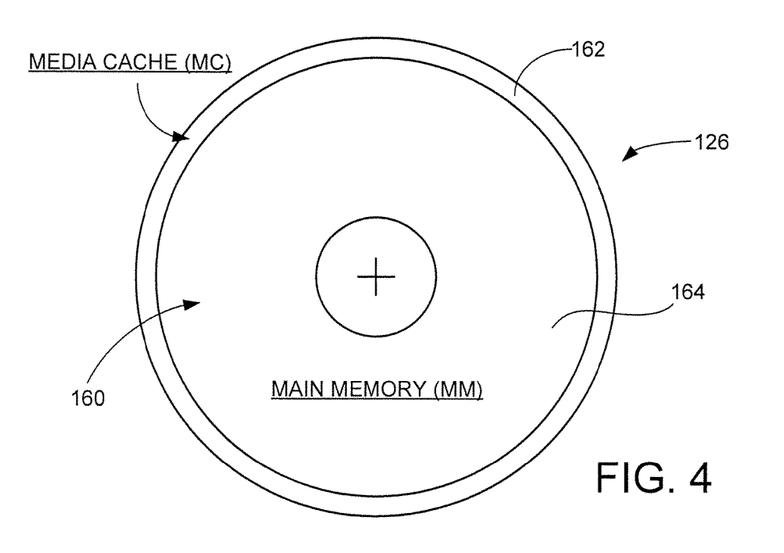
FIG. 4 shows a data recording surface of the device with tracks such as described in FIG. 3 arranged to form a media cache (MC) portion and a main memory (MM) portion.

FIG. 4 shows a data recording surface 160 of the medium 126 from FIG. 2 in accordance with some embodiments. The surface 160 is arranged into two main zones: a media cache (MC) 162 and a main memory (MM) 164. Each of these respective zones 162, 164 comprise a number of adjacent concentric data tracks configured to store user data supplied by the host device. The media cache 162 may be arranged adjacent the outermost diameter of the recording surface as depicted in FIG. 4, or may be located elsewhere on the disc surface. In alternative embodiments, the media cache (or portions thereof) may be provisioned elsewhere within the storage device, including in the flash memory 118 (FIG. 2).

The media cache 162 operates as a temporary storage location for input write data. During a write operation, input data are temporarily received and stored in the volatile buffer memory 116 (see FIG. 2). A write channel portion of the channel circuit 120 conditions the data by applying various encoding operations such as run length limited (RLL) encoding, encryption, data compression, error correction encoding (ECC), etc., and directions the writing of the encoded input data to either the media cache 162 or the main memory 164. If the data are initially written to the media cache 162, a subsequent background data transfer operation will be scheduled and performed to transfer the data from the media cache 162 to the appropriate location in the main memory 164. A copy of the data may be retained within the media cache 162 for a time to facilitate the possibility of cache hits upon the data. Cache management schemes, such as least recently used (LRU) eviction methods, can be used to maintain the data levels within the media cache 162 at appropriate levels.

The size of the media cache 162 relative to the overall data storage capabilities of the main memory 164 can vary depending on the requirements of a given application. In some cases, each of the data recording surfaces has its own portion of the media cache 162 arranged adjacent the OD of the associated surface as shown in FIG. 4, so that all of the portions comprise the overall available media cache. As noted above, other locations can additionally and/or alternatively used as the media cache as well, including at least a portion of the flash memory 118 in FIG. 2.

Figure 5:
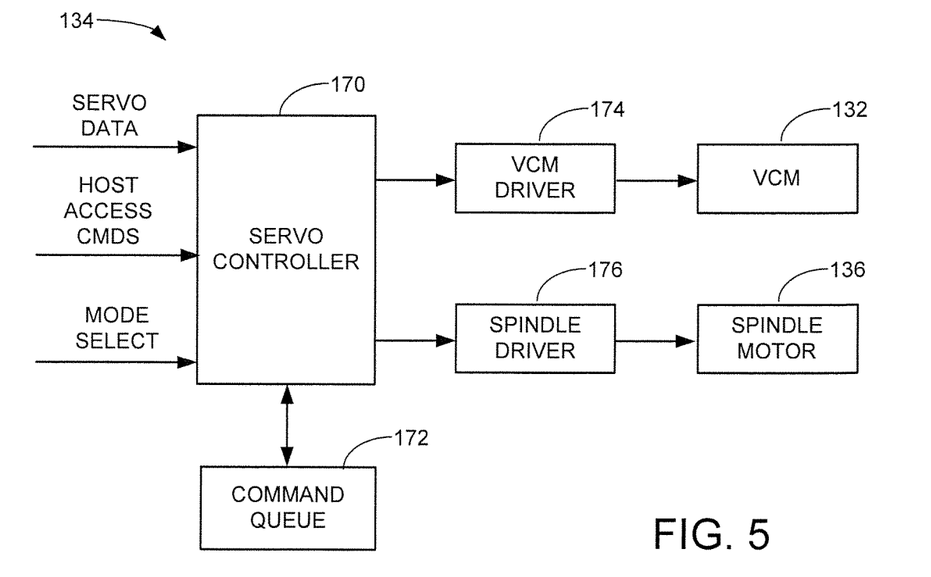
FIG. 5 shows aspects of the servo control circuit of the device in FIG. 2 in accordance with some embodiments.

FIG. 5 shows aspects of the servo control circuit 134 from FIG. 2 in accordance with some embodiments. A servo controller 170 may take the form of a programmable processor circuit that executes programming instructions in a local memory. During operation, the servo controller 170 receives a number of inputs including the demodulated servo data from the servo fields 132 discussed above in FIG. 3, from which the servo controller 170 derives, inter alia, an existing position reference for the selected transducer 124. An observer/predictor model may be used to provide additional estimates of the transducer position at selected sample locations between the regular occurrence of the servo fields 132.

The servo controller 170 receives a listing of host access commands (e.g., read and write commands) that have been received by the device 110. These commands may be decoded in the form of locations to which the associated head are to be positioned. The commands are placed in a command queue 172 and a sophisticated sorting algorithm takes into account the relative locations (both angular and radial) of the destination sectors to provide an optimal ordering for the execution of those commands.

Based on the servicing of the pending commands in the command queue 172, the servo controller 170 outputs DAC command inputs to a VCM driver circuit 174 to supply current to the VCM 132 to sweep the transducer radially across the disc surface 160 to a new destination track, or to nominally maintain the transducer over the existing track.

The servo controller 170 further supplies DAC command inputs to a spindle motor driver circuit 176 used to control the rotation of the spindle motor 136. Commutation signals may be generated and used to maintain the disc 126 at the desired rotational rate. A hardware manager operation based on frequency locking onto the index portions of the servo fields can form a portion of the closed loop spindle control. It will be appreciated that the spindle motor rotates the medium using constant angular velocity (CAV) rotation so that the medium maintains a constant angular velocity irrespective of the radial location of the data transducer.

As noted above, the exemplary storage device 110 is configured to rotate the spindle motor 136, and hence the disc(s) 126, at two (or more) different operational speeds (e.g., two or more CAVs). Without limitation, in one embodiment a first, lower speed is selected to be nominally 5400 rpm and a second, higher speed is selected to be nominally 7200 rpm so that the lower speed is nominally 75% of the higher speed. Other respective values, including other speeds or additional speeds (such as three different speeds, etc.), can be used as desired.

The different speeds may be selected responsive to a mode select input supplied to the servo controller 170. The mode select input may be provided from another portion of the storage device 110, such as the top level controller 112. In other embodiments, the servo controller 170 evaluates the existing mix of pending access commands (as well as, as desired, recent history of commands) to self-select the appropriate mode (e.g., faster or slower). It will be recognized that speed changes between these two values can be carried out relatively quickly, but not instantaneously. Hence, the servo controller 170 will tend to maintain a given mode and reduce inadvertent switching between modes to reduce operational latencies involved in speed switches.

Figure 6:
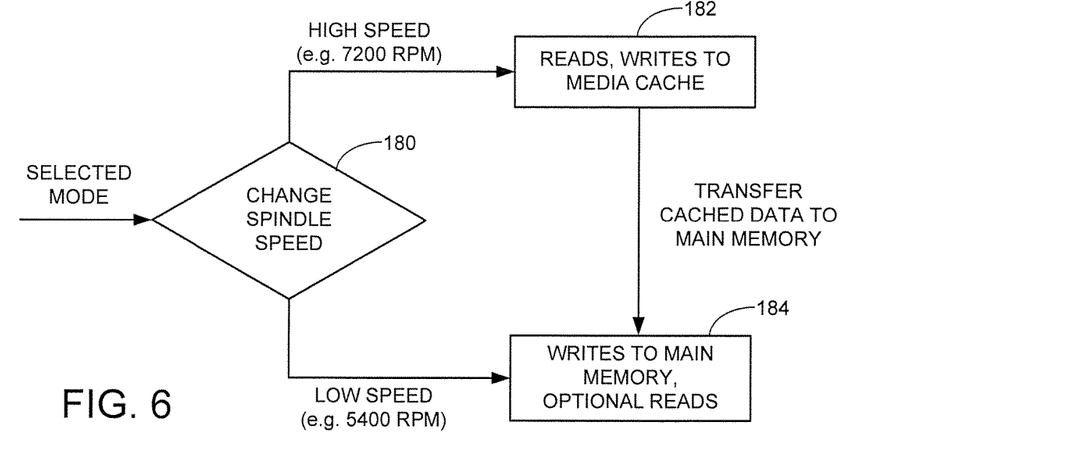
FIG. 6 is a selection diagram illustrating two exemplary available spindle motor speeds.

FIG. 6 provides a simplified decision tree diagram to illustrate operation of the servo circuit 126 in some embodiments. Decision step 180 generally signifies a change in spindle speed has been enacted between the relatively higher speed (e.g., 7200 rpm) and the relatively lower speed (e.g., 5400 rpm). Operational block 182 indicates that, during high speed operation, reads are carried out throughout the system, including at any location including the media cache 162 and the main memory 164. It is contemplated albeit not necessarily required that most reads will be selected to be performed at the higher speed, since this will tend to enhance the data transfer rate performance of the storage device 110.

Block 182 further shows that writes are carried out at the higher speed only to the media cache 162; that is, writes do not occur to the main memory area 164 at the higher speed. Thus, in a read dominated environment, the device can select higher speed operation and satisfy the pending read commands while maintaining the higher disc speed. The occurrence of write commands at the higher speed can be serviced by writing the pending encoded write data to the media cache 162, thus eliminating the requirement to lower the rate of rotation of the disc(s).

Block 184 in FIG. 6 signifies selection of the relatively lower speed (e.g. 5400 rpm). At this speed, writes are carried out to the main memory 164. Reads can be carried out at the lower speed as well, either from the media cache 162 or the main memory 164.

FIG. 6 shows that when data are written to the media cache 162, a subsequent transfer of the write data from the media cache to the main memory 164 will take place once the next change in spindle speed is enacted to the lower speed. It will be recalled that while the disc based media cache 162 is contemplated as shown in FIG. 4, other media cache arrangements can be used including flash memory. As before, it will be appreciated that writes can take place to the flash memory without the need to slow down the disc rotational rate.

Figure 7:
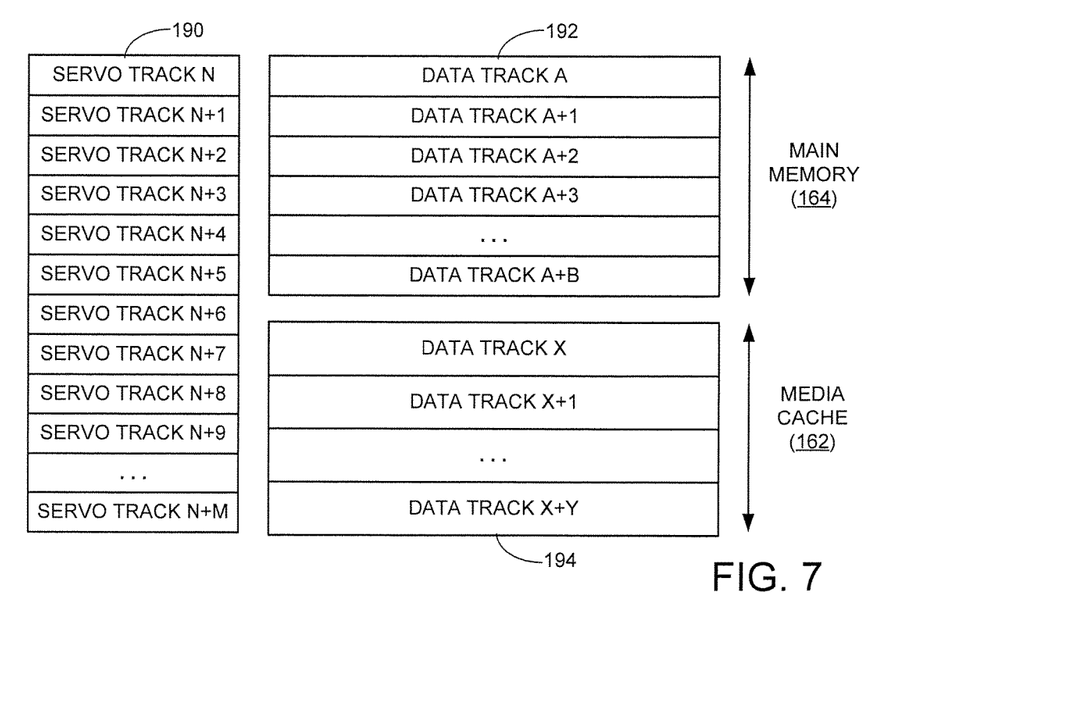
FIG. 7 illustrates different track configurations for the main memory and the media cache in some embodiments.

FIG. 7 is a simplified diagram of a number of servo tracks 190, main memory data tracks 192 and media cache data tracks 194. The respective servo tracks 190 are arbitrarily denoted from N to N+M; the main memory tracks 192 are denoted from A to A+B; and the media cache tracks 194 are denoted from X to X+Y. The respective tracks are not drawn to scale and are merely illustrative of one possible arrangement that may be utilized.

Generally, each servo track 190 can be thought of as all of the servo fields 142 (FIG. 3) that are arranged at a given radial location on the media surface 160. The various main memory data tracks 192 may be nominally aligned with the servo tracks 190 as shown, or can be arbitrarily located as desired so as to be wider than, narrower than, and offset from, the associated servo tracks 190. Nevertheless, during the writing and reading of data to and from the various data sectors 144 (see FIG. 3) along a given main memory data track 192, such as data track A, the associated servo data from the closest servo track or tracks will be used to locate and maintain the position of the associated transducer.

As will be observed from FIG. 7, the respective media cache data tracks 194 have a radial track width that is greater than the radial track width of the main memory data tracks 192 (e.g., each of the media cache tracks are "wider" in a cross-track direction as compared to the main memory data tracks). In other embodiments, the media data data tracks 194 may have a radial track pitch that is greater than the radial track pitch of the main memory data tracks (e.g., the radial distance from the centers of adjacent media cache tracks is greater than the radial distance from the centers of adjacent main memory data tracks). In some cases, both greater data track widths and greater data track pitches are used.

Such arrangements can be carried out on the basis that writes to the data sectors on the tracks 194 will take place at the higher rotational speed while the writes to the data sectors on the tracks 192 will take place a the lower rotational speed. Because of the additional amount of NRRO and other effects, using wider tracks (and/or more spaced apart tracks) in the media cache can account for issues relating to the higher rotational rate. The use of wider media cache tracks is contemplated but not necessarily required.

Additionally or alternatively, lower linear bit recording densities (e.g., data densities) can be used for the tracks 194 as compared to the tracks 192; that is, lower write frequencies can be used to enhance the writing operation to the media cache 162. In this case, each data sector on the tracks 194 may be physically longer than the data sectors on tracks 192. In one embodiment, interspersed odd and even tracks are written to the main memory 164 and only a selected one of these types of tracks, such as odd tracks, are written to the media cache 162.

Figure 8:
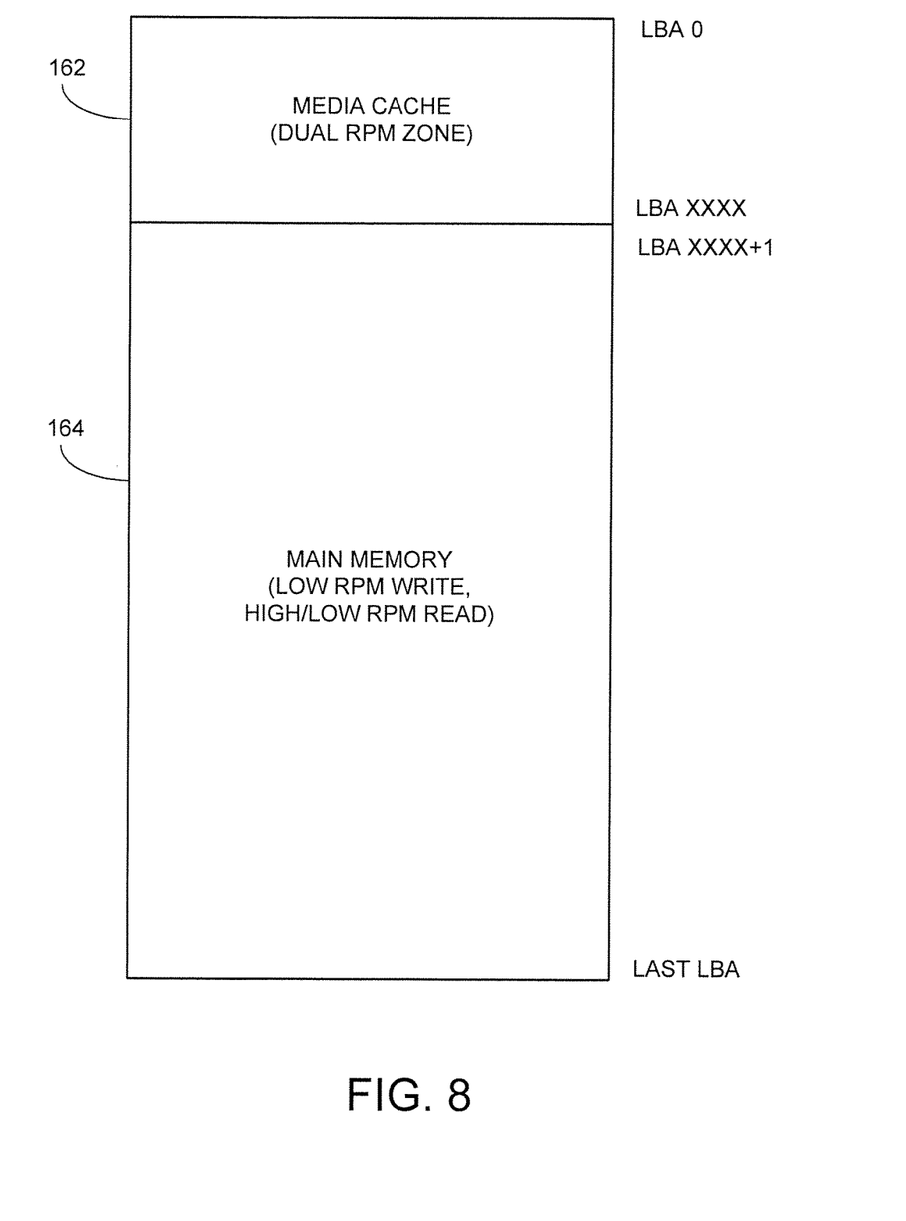
FIG. 8 is a memory map diagram illustrating the media cache and main memory portions in further embodiments.

FIG. 8 is another diagrammatic representation of the respective media cache 162 and the main memory 164. As discussed above, the media cache can be viewed as a dual rpm zone since both writes and reads can take place to this zone at both the higher and lower speeds. The main memory 164 is viewed as a low speed (low rpm) write zone and a low/high speed read zone.

In some embodiments, memory mapping can be used such that host level LBAs are assigned to these respective zones. For example, a first number of LBAs from LBA 0 to LBA XXXX can be assigned to the media cache (dual speed zone) 162, and then LBAs XXXX+1 to the last LBA can be assigned to the main memory 164. This can be useful in certain circumstances where selected data sets of high interest, such as host OS files, can be pinned to the media cache 162. An advantage of this approach is that such files can be respectively written and read irrespective of the actual speed of the spindle motor.

Figure 9:
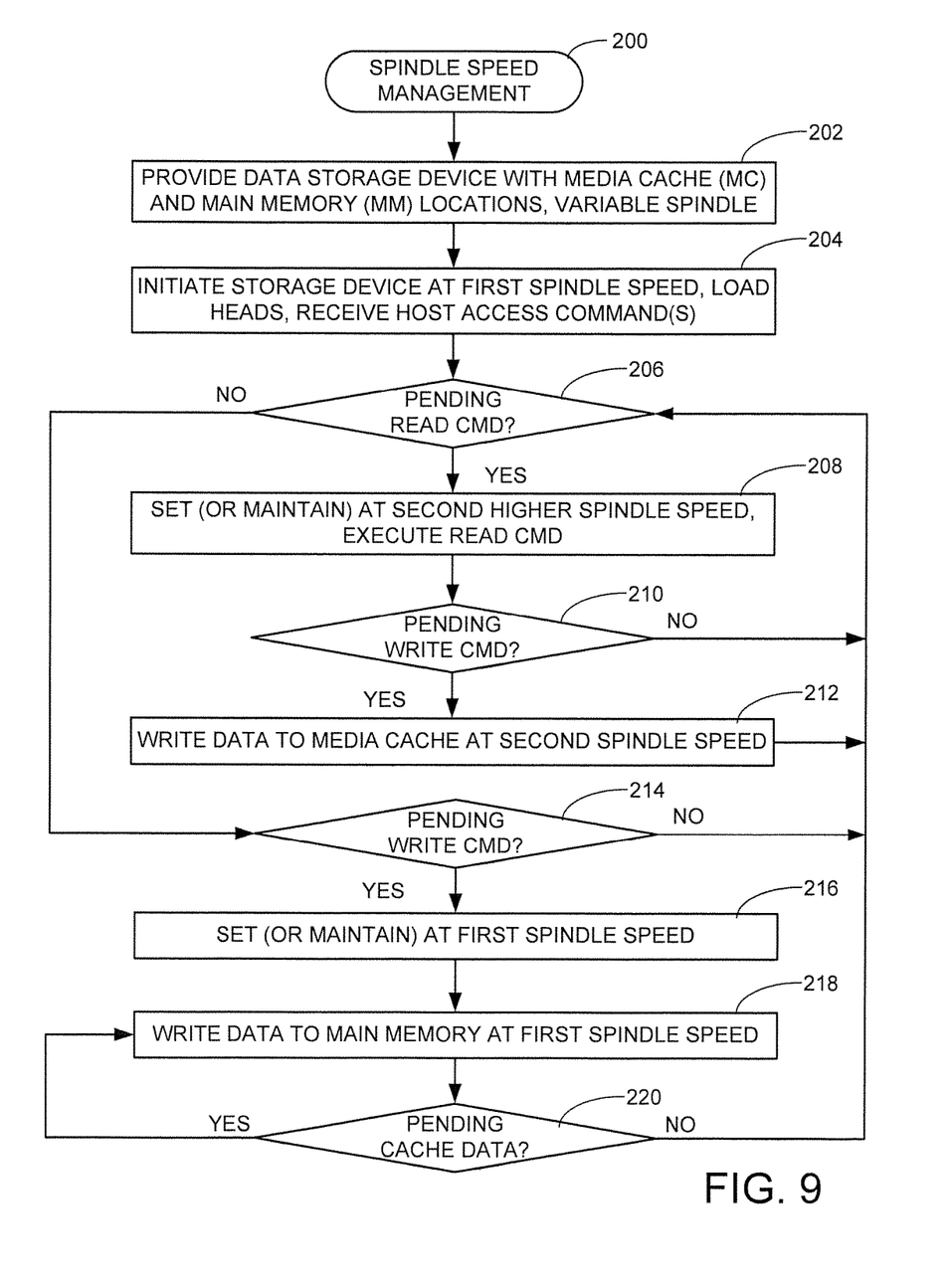
FIG. 9 is a flow chart for a spindle speed management routine illustrative of steps carried out by the device of FIG. 2 in accordance with some embodiments.

FIG. 9 is a flow chart for a spindle speed management routine 200 illustrative of steps that may be carried out in accordance with the foregoing discussion. It is contemplated albeit not necessarily required that the various steps in FIG. 9 may represent programming stored in a local memory and executed by the servo controller 170. The various steps are merely exemplary so that the various steps can be modified, augmented, omitted, performed in a different order, and so on.

The routine commences at step 202 with the provision of a data storage device with a rotatable data recording medium, a variable speed spindle motor adapted to rotate the data recording medium at different speeds during operation, and a main memory location on the data recording medium. The storage device is further provided with a media cache, which may also form a portion of the data recording medium or may be provisioned elsewhere in the device, such as the aforedescribed flash memory.

The device is initialized at step 204 so that the medium is initially rotated at a first one of the selected speeds, the associated data transducer(s) are loaded onto the surfaces and the device is placed in a position to begin receiving host access commands. In the routine of FIG. 9, it is presumed that the device is initialized at the lower rotational speed; such is merely exemplary and is not limiting as the higher speed can be used first as desired. Moreover, multiple speeds beyond just two speeds can be used.

Decision step 206 determines whether, during the receipt of the host access commands, a read command has been received. If so, the routine passes to step 208 where the spindle motor is accelerated to the second higher spindle speed, and the read command is serviced at this higher speed. As noted above, it is not strictly necessary to accelerate to the higher speed based on receipt of a single read command, although such operation can take place. It is contemplated that deeper heuristics may take place; for example, some minimum threshold number T of pending read commands (e.g., 3-10, etc.) may be required before the device accelerates to the higher speed.

The logic shows that after execution of the read command(s), decision step 210 determines whether any pending write commands have been received. If so, as noted above the pending write data will be written to the media cache, step 212, while the disc continues to rotate at the higher speed.

Returning to step 206 and remembering that at this point the media are still rotating at the slower speed, if no read commands have been received the flow passes to decision step 214 which determines whether one or more pending write commands are present. If so, the media speed is set or maintained at the current lower speed, step 216, and data are written to the main memory at the first spindle speed, step 218. As desired, if there are pending writeback data sets in the media cache, decision step 220, these can be transferred to the main memory as well.

Figure 10:
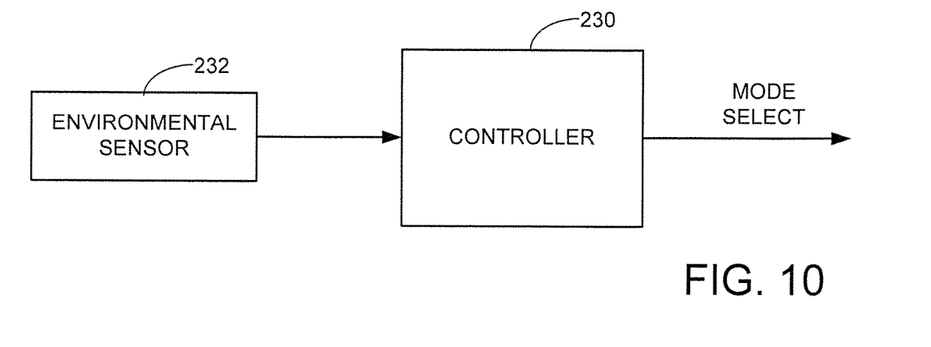
FIG. 10 shows another controller of the exemplary storage device which uses input from an environmental sensor to provide mode selection inputs to set the rotational speed of the media.

FIG. 10 shows another controller circuit 230 in accordance with some embodiments. The controller circuit 230 may correspond to the various controllers 102, 112, 170 discussed above, or may be another controller circuit of the system. An environmental sensor 232 detects environmental conditions of the device and provides inputs to the controller circuit 230. In response, the controller circuit 230 outputs an appropriate mode select value to set the rotational speed accordingly. The environmental sensor may sense, inter alia, temperature, vibration (rotational and/or translational), atmospheric pressure, electrical source power, or any other environmental factor(s) or parameter(s) that may affect the operation of the device.

Figure 11:
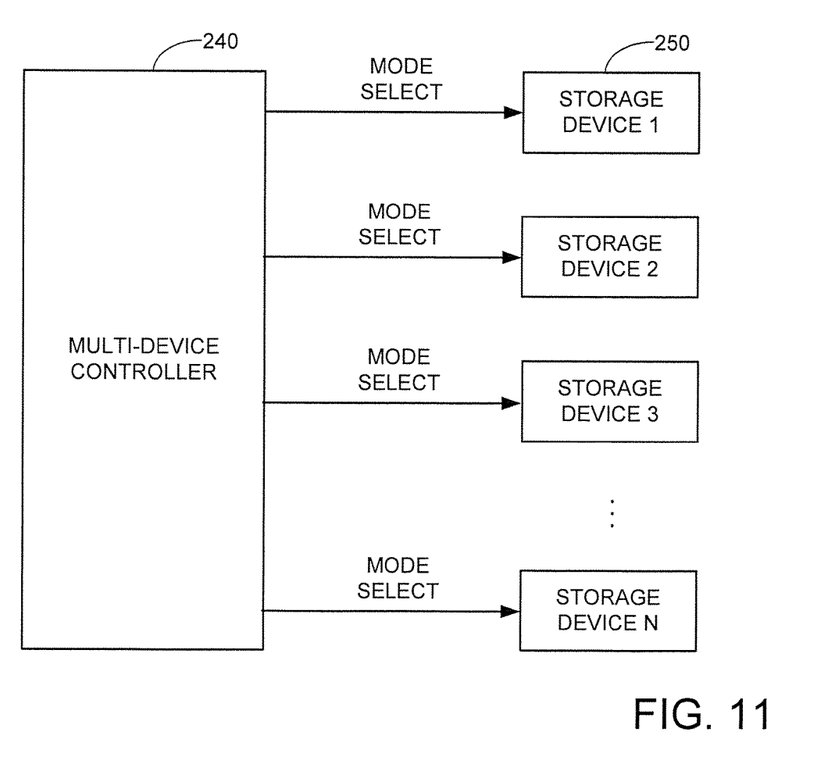
FIG. 11 shows a multi-device controller that provides mode select inputs to a number of data storage devices in accordance of further embodiments.

FIG. 11 shows a multi-device controller circuit 240 in conjunction with a plural number N of data storage devices 250. The devices 250 may be similar to the device 110 discussed above. The controller circuit 240 may be a hardware or programmable processor used to control data operations with the N data storage devices, such as in a multi-device enclosure (e.g., RAID environment, cloud computing environment, etc.). In some cases, the controller circuit 240 may be characterized as a storage server.

In FIG. 11, external conditions may result in the top level multi-device controller issuing mode select commands to the respective data storage devices. In some cases, all devices may be uniformly commanded to a selected speed, such as the higher speed or the lower speed. Temperature, vibration, power consumption, and host data I/O rate requirements are exemplary factors that may be used to select one speed over another. In other cases, individual storage devices 250 may be commanded to operate at different speeds; for example, storage devices 1-3 may be commanded to rotate at one speed while other devices, such as devices N−1 and N, may be commanded to rotate at a different speed. This decision can also take into account a number of factors such as those set forth above.

It will now be appreciated that the various embodiments presented herein can provide a number of benefits. Using a dual speed (or multi-speed) spindle motor can allow reads at a higher rate and writes in a more carefully controlled, less noise intensive environment. The use of a media cache allows pending write data sets to be written at the higher speed and transferred to the main memory area later once the device uses the lower speed. Both lower and higher speeds can be used for a given power source setting, such as during battery powered mode, during use of AC input power, etc. Mode selects can be externally generated and communicated to the device, such as from a multi-device controller that indicates that a lower speed should be used based on certain environmental conditions such as nearby devices involving writes, etc.

While various embodiments have contemplated the use of rotatable perpendicular magnetic recording discs, other various forms of rotatable media can be used, including shingled media, bit patterned media, discrete track media, heat assisted magnetic recording (HAMR) media, optical media, magneto-optical media, etc.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising:
a rotatable data recording medium supported by a spindle motor to provide a main memory as a non-volatile data storage area, the spindle motor configured to provide constant angular velocity (CAV) rotation of the medium at different nominally constant speeds;
a read/write data transducer configured to write data to and read data from the main memory;
a media cache comprising a non-volatile data storage area; and
a control circuit configured to direct the rotation of the data recording medium at a first speed during write operations by the data transducer to write a first set of user data blocks to the main memory responsive to a first set of host access commands received from a host device while the data recording medium is rotated at the first speed, to direct the rotation of the data recording medium at a second speed greater than the first speed during read operations by the data transducer to read a second set of user data blocks from the main memory responsive to a second set of host access commands received from the host device, the control circuit further configured to direct the writing of a third set of user data blocks to the media cache instead of to the main memory responsive to a third set of host access commands received from the host device while the data recording medium is rotated at the second speed so that no user data blocks are written to the main memory at the second speed.

2. The apparatus of claim 1, wherein the main memory comprises a first plurality of data tracks at a first radial location on the medium, and the media cache comprises a different, second plurality of data tracks at a different, second radial location on the medium.

3. The apparatus of claim 2, wherein the first plurality of data tracks each have a first radial track pitch, and the second plurality of data tracks each have a second radial track pitch greater than the first radial track pitch to compensate for non-repeatable runout (NRRO) errors induced during the rotation of the medium at the second speed.

4. The apparatus of claim 2, wherein the first plurality of data tracks have a first radial track density, and the second plurality of data tracks have a second radial track density less than the first radial track density.

5. The apparatus of claim 2, wherein the user data are written to the first plurality of data tracks at a first data frequency, and the user data are written to the second plurality of data tracks at a lower second data frequency.

6. The apparatus of claim 1, wherein the media cache comprises solid-state non-volatile semiconductor memory.

7. The apparatus of claim 1, wherein the first speed is nominally 75% of the second speed.

8. The apparatus of claim 1, wherein the control circuit transitions from the first speed to the second speed responsive to a mode select value supplied by a multi-device controller circuit in a multi-storage device environment.

9. The apparatus of claim 1, wherein the first speed is nominally 5400 revolutions per minute (rpm) and the second speed is nominally 7200 rpm.

10. The apparatus of claim 1, wherein the control circuit is further configured to subsequently transfer the user data written to the media cache at the second speed to the main memory while the medium rotates at the first speed.

11. A method comprising:
providing a data storage device having a media cache, a data storage medium rotatable at different selectable constant angular velocity (CAV) speeds and having a first plurality of data tracks to define a main memory, and a data read/write transducer configured to access the first plurality of data tracks in the main memory;
using the transducer to write a first set of user data blocks to the first plurality of data tracks in the main memory responsive to a first set of host access commands received from a host device during rotation of the medium at a first speed and to read a second set of user data blocks from the first plurality of data tracks in the main memory responsive to a second set of host access commands received from the host device, the medium accelerated to a second speed greater than the first speed prior to the reading of the second set of user data blocks responsive to the receipt of the second set of host access commands; and writing a third set of user data blocks to the media cache instead of to the main memory responsive to a third set of host access commands received from the host device during rotation of the medium at the second speed so that no user data blocks are written to the main memory while the medium is rotated at the second speed; and subsequently transferring the third set of user data blocks from the media cache to the main memory responsive to a deceleration of the medium from the second speed to the first speed.

12. The method of claim 11, wherein the media cache is disposed on the medium as a second plurality of data tracks.

13. The method of claim 12, wherein the second plurality of data tracks in the media cache have at least a selected one of a radial track width or a radial track pitch as compared to the first plurality of data tracks in the main memory.

14. The method of claim 12, wherein the second plurality of data tracks are written at a lower frequency than the first plurality of data tracks in the main memory.

15. The method of claim 11, wherein the media cache comprises solid-state non-volatile semiconductor memory.

16. The method of claim 11, further comprising temporarily storing the third set of user data blocks in a buffer memory, providing a write complete status to the host device responsive to the third set of access commands, and transferring the third set of user data blocks from the buffer memory to the media cache after the write complete status is provided to the host device.

17. The method of claim 11, further comprising rotating the medium at both the first and second speeds using a common source of power comprising a selected one of a battery or alternating current (AC) power.

18. A hard disc drive (HDD), comprising:
a rotatable data recording medium supported by a spindle motor to provide a main memory as a non-volatile data storage area comprising a first set of concentric data tracks at a first radial pitch and a media cache as a non-volatile data storage area comprising a second set of concentric data tracks at a second radial pitch greater than the first radial pitch;
a spindle motor control circuit coupled to the spindle motor and configured to rotate the medium at a first speed and a second speed greater than the first speed;
a read/write data transducer configured to write data to and read data from the main memory and the media cache; and
a controller circuit configured to direct the writing of a first set of user data blocks by the transducer to the main memory responsive to a first set of write commands received from a host device during the rotation of the medium at the first speed and to direct the writing of a second set of user data blocks by the transducer to the media cache responsive to a second set of write commands received from the host device during the rotation of the medium at the second speed.

19. The HDD of claim 18, wherein the controller circuit is further configured to, responsive to receipt of a first set of read commands from the host, direct the spindle motor control circuit to accelerate the medium from the first speed to the second speed and to direct the transducer to read a third set of user data blocks from a selected one of the main memory or the media cache identified by the first set of read commands.

20. The HDD of claim 18, wherein the controller circuit is further configured to direct the spindle motor control circuit to decelerate the medium from the second speed to the first speed, followed by directing the transducer to migrate the second set of user data blocks from the media cache to the main memory while the medium is rotated at the first speed.

* * * * *